(12) United States Patent
Smith et al.

(10) Patent No.: US 7,874,605 B2
(45) Date of Patent: Jan. 25, 2011

(54) UTILITY VEHICLE

(75) Inventors: Craig Smith, Newnan, GA (US); Takashi Yamamura, Shizuoka (JP); Akira Inui, Shizuoka (JP); Chaitanya Tadipatri, Newnan, GA (US)

(73) Assignees: Yamaha Hatsudoki Kabushiki Kaisha, Shizuoka (JP); Yamaha Motor Manufacturing Corporation of America, Newnan, GA (US)

( * ) Notice: Subject to any disclaimer, the term of this patent is extended or adjusted under 35 U.S.C. 154(b) by 0 days.

(21) Appl. No.: 12/361,608

(22) Filed: Jan. 29, 2009

(65) Prior Publication Data
US 2009/0184534 A1 Jul. 23, 2009

Related U.S. Application Data

(63) Continuation-in-part of application No. 12/017,865, filed on Jan. 22, 2008, now Pat. No. 7,735,889.

(51) Int. Cl.
*B60N 2/00* (2006.01)
*B62D 25/06* (2006.01)

(52) U.S. Cl. ............ 296/64; 296/63; 296/193.01; 296/203.01

(58) Field of Classification Search ............ 296/193.07, 296/204, 63, 64, 65.01, 65.13, 193.01, 193.08, 296/193.12, 198, 203.01; 180/89.2, 312
See application file for complete search history.

(56) References Cited

U.S. PATENT DOCUMENTS

| | | | |
|---|---|---|---|
| 5,327,989 A * | 7/1994 | Furuhashi et al. | 180/248 |
| D483,695 S * | 12/2003 | Bellington | D12/16 |
| 6,905,159 B1 * | 6/2005 | Saito et al. | 296/65.01 |
| 7,249,798 B2 | 7/2007 | Saito | |
| 7,422,082 B2 * | 9/2008 | Reffitt | 180/90.6 |
| 2008/0023249 A1 * | 1/2008 | Sunsdahl et al. | 180/312 |
| 2008/0289896 A1 * | 11/2008 | Kosuge et al. | 180/312 |
| 2009/0178871 A1 * | 7/2009 | Sunsdahl et al. | 180/233 |
| 2009/0256388 A1 * | 10/2009 | Tanaka et al. | 296/186.4 |

* cited by examiner

*Primary Examiner*—Patricia L Engle
(74) *Attorney, Agent, or Firm*—Keating & Bennett, LLP

(57) ABSTRACT

A utility vehicle includes a vehicle body frame including a left and right side portion, a front seat affixed to the vehicle body frame, and a rear seat affixed to the vehicle body frame provided to the rear of the front seat. The vehicle also includes a rear roof support structure including a left member and right pipe member that extend generally in the vertical direction from the vehicle body frame, disposed respectively at both the left and right side portions of the vehicle body frame to the rear of the rear seat. At least a downward direction portion of the left pipe member and right pipe member are positioned lower than a seating surface of a seat cushion portion of the rear seat and are angled so as to extend rearward as the left and right pipe members extend upward. A pair of rear wheels are supported by the vehicle body frame provided at a position that is below the seat cushion portion of the rear seat wherein, at least a portion thereof, is coincident with the rear seat and with the rear roof support structure in the front/back direction of the vehicle.

13 Claims, 13 Drawing Sheets

US 7,874,605 B2

UTILITY VEHICLE

This is a continuation-in-part application of Ser. No. 12/017,865 filed on Jan. 22, 2008 now U.S. Pat. No. 7,735,889.

FIELD OF THE INVENTION

The present invention relates to an improved design for a utility vehicle that allows improved ingress/egress for passengers.

BACKGROUND OF THE INVENTION

Utility vehicles with more than one row of seating are known in the art. Among this type of vehicle there are vehicles that have a front seat and a rear seat, provided behind the front seat, as seats wherein the passengers sit. For example, U.S. Pat. No. 7,249,798 discloses a utility vehicle with an upper portion of the cabin structured by connecting together the top portions of a plurality of roof support structures using roof members, producing a cabin with a feeling of spaciousness, while having a front seat and a rear seat.

However, while this type of conventional vehicle has a wide cabin, the rear floor extends forward and backward in order to increase the ease of ingress/egress of the passengers in the rear seat. Because of this, the length of the vehicle is longer, so there is a shortcoming in the ability to make the vehicle compact. While one may consider shortening the front/back length of the rear floor in order to achieve a more compact vehicle, doing so not only damages the feeling of spaciousness for the passengers, but also reduces the ease of ingress/egress for the passengers.

SUMMARY OF THE INVENTION

Accordingly, what is needed is a vehicle that secures easy ingress/egress for the passengers in the rear seat while still achieving a more compact vehicle.

The difficulty of easy passenger ingress/egress can be reduced while still achieving a more compact vehicle, without affecting the feeling of spaciousness of the cabin, through innovations in the shape of the lower portion of the roof support structure that are positioned in essentially the center of the vehicle in the front/back direction and the roof supports that are positioned to the sides of the rear seats.

Furthermore, the placement of the rear wheels in a position below at least a portion of the rear seat and rear roof support structure allows the utility vehicle to be more compact.

In one exemplary embodiment, the present invention includes A utility vehicle including: a vehicle body frame including a left and right side portion; a front seat affixed to the vehicle body frame; a rear seat affixed to the vehicle body frame provided to the rear of the front seat; a rear roof support structure including a left member and right pipe member that extend generally in the vertical direction from the vehicle body frame, disposed respectively at both the left and right side portions of the vehicle body frame to the rear of the rear seat, wherein at least a downward direction portion of the left pipe member and right pipe member are positioned lower than a seating surface of a seat cushion portion of the rear seat and are angled so as to be positioned further towards the back the higher up; and a pair of rear wheels supported by the vehicle body frame provided a position that is below the seat cushion portion of the rear seat wherein, at least a portion thereof, is coincident with the rear seat and with the rear roof support structure in the front/back direction of the vehicle.

Given the vehicle as set forth in the present invention, the lower portion of the third roof support that is positioned lower than at least the seating surface of the seat cushion portion of the rear seat is angled so as to be further toward the back the higher up, enabling the rear wheels to be positioned further forward, making it possible to make the vehicle more compact while achieving a spacious cabin. Additionally, the lower portion of the second support that is positioned lower than at least the seating surface of the seat cushion portion of the rear seat is angled so as to be further toward the front seat the lower down, making it possible to secure easy ingress/egress for the passengers in the rear seat while enabling the vehicle to be made more compact.

DETAILED DESCRIPTION OF THE INVENTION

Figure 1:
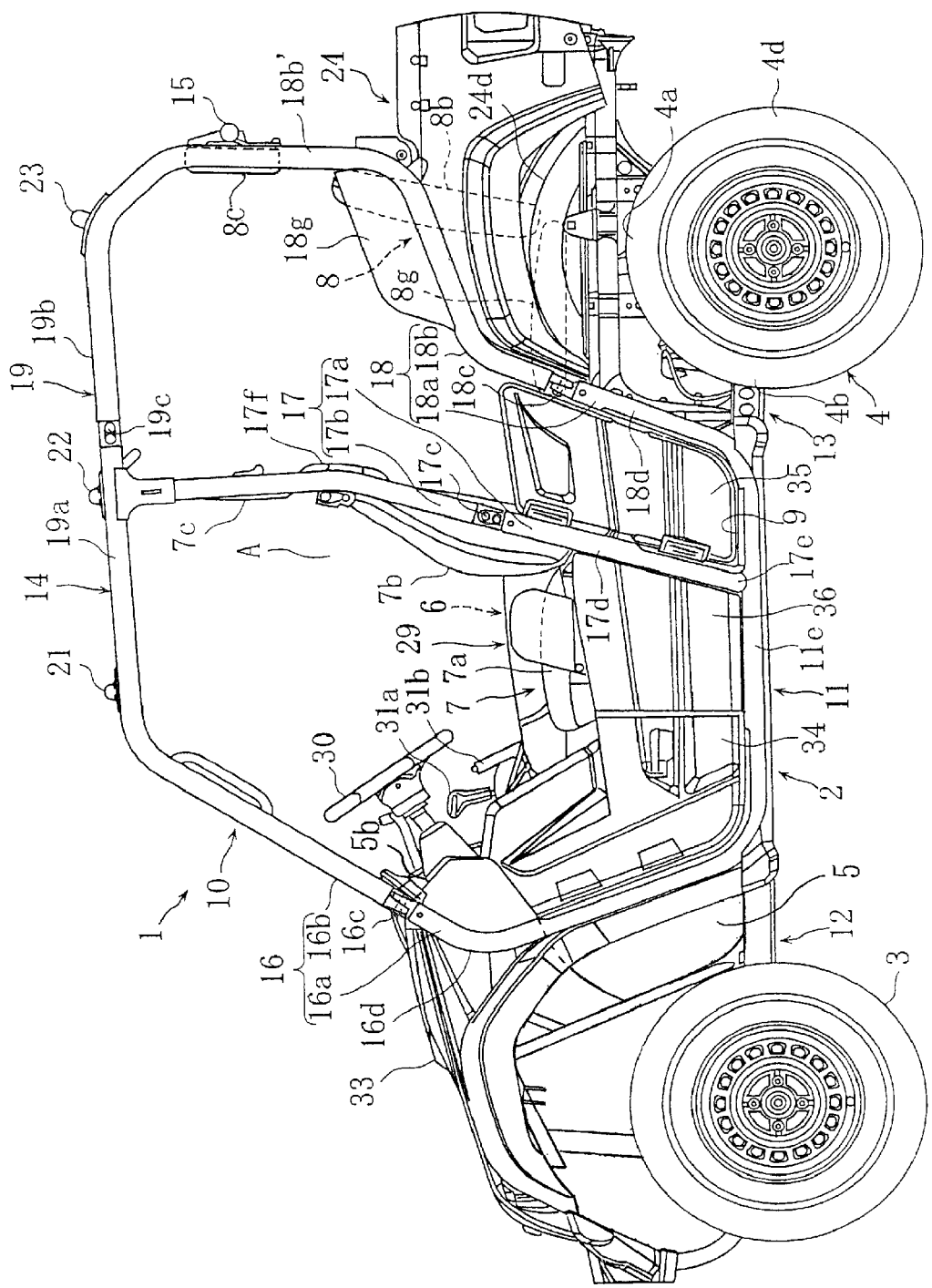
FIG. 1 is a left side view of an utility vehicle as set forth in one example of embodiment according to the present invention.
Figure 2:
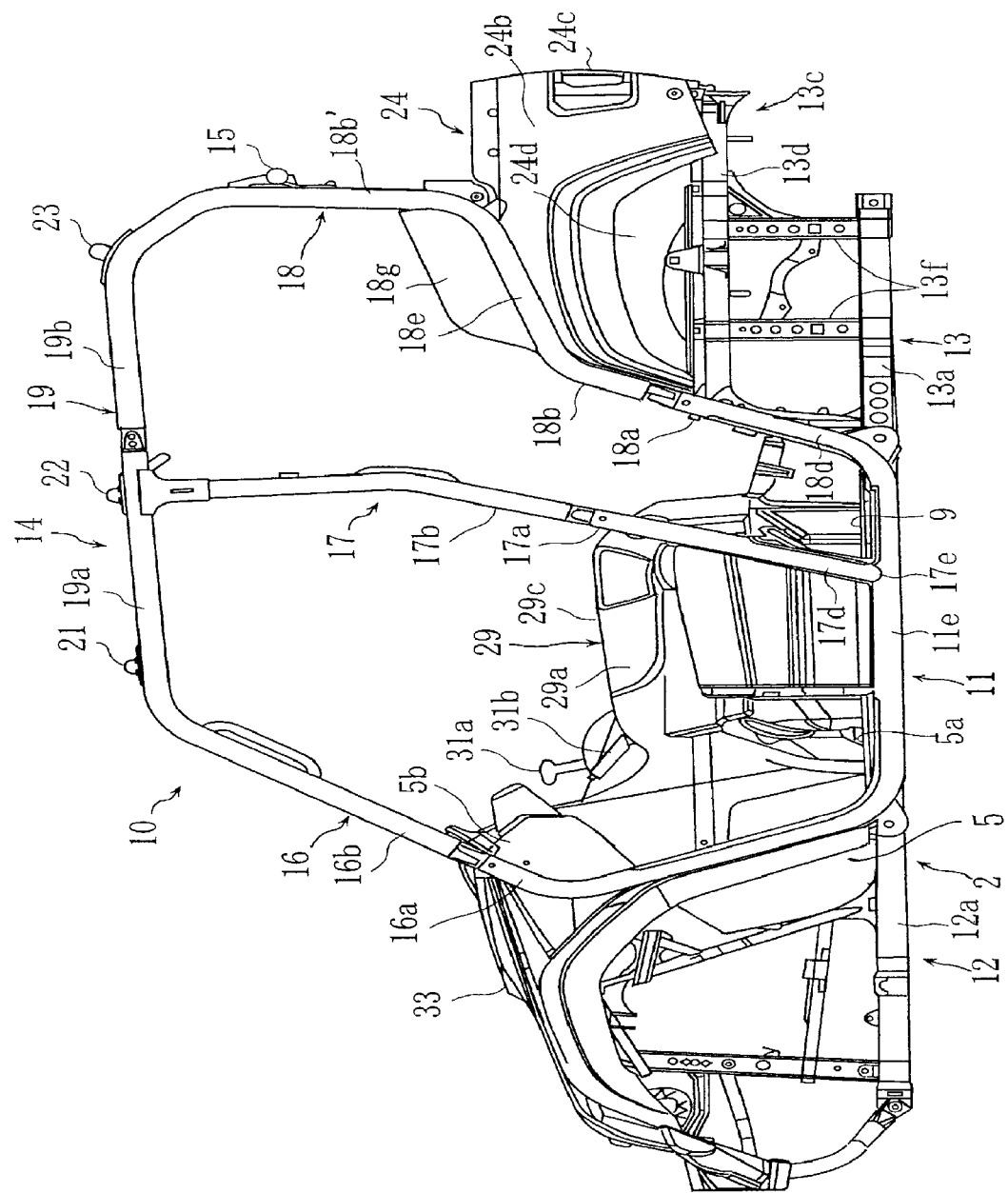
FIG. 2 is a left side view of the state wherein the wheels, seats, door, etc., have been removed from the vehicle.
Figure 3:
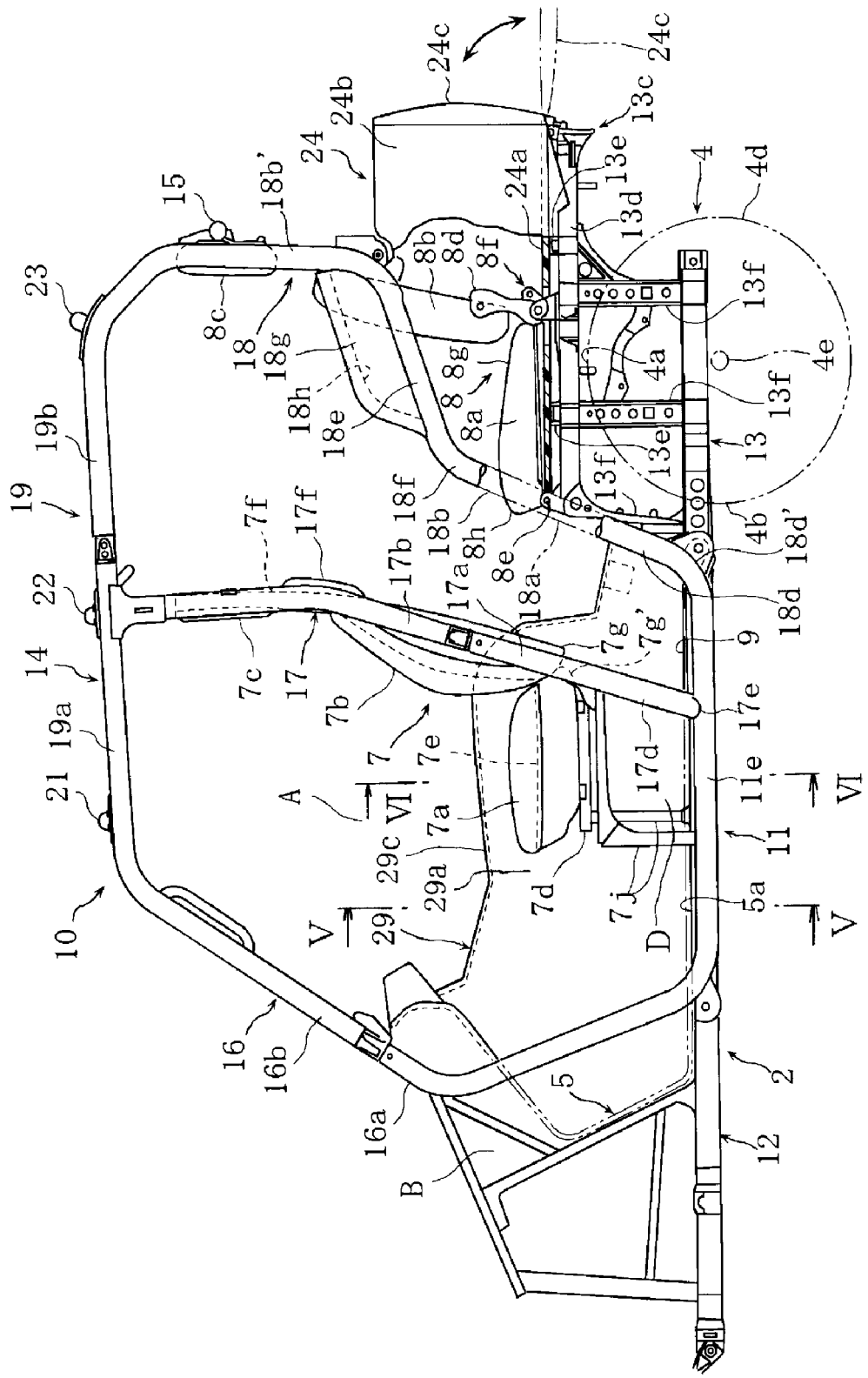
FIG. 3 is a left side view illustrating the vehicle body frame, the roof support, the roof member, and the seats.
Figure 4:
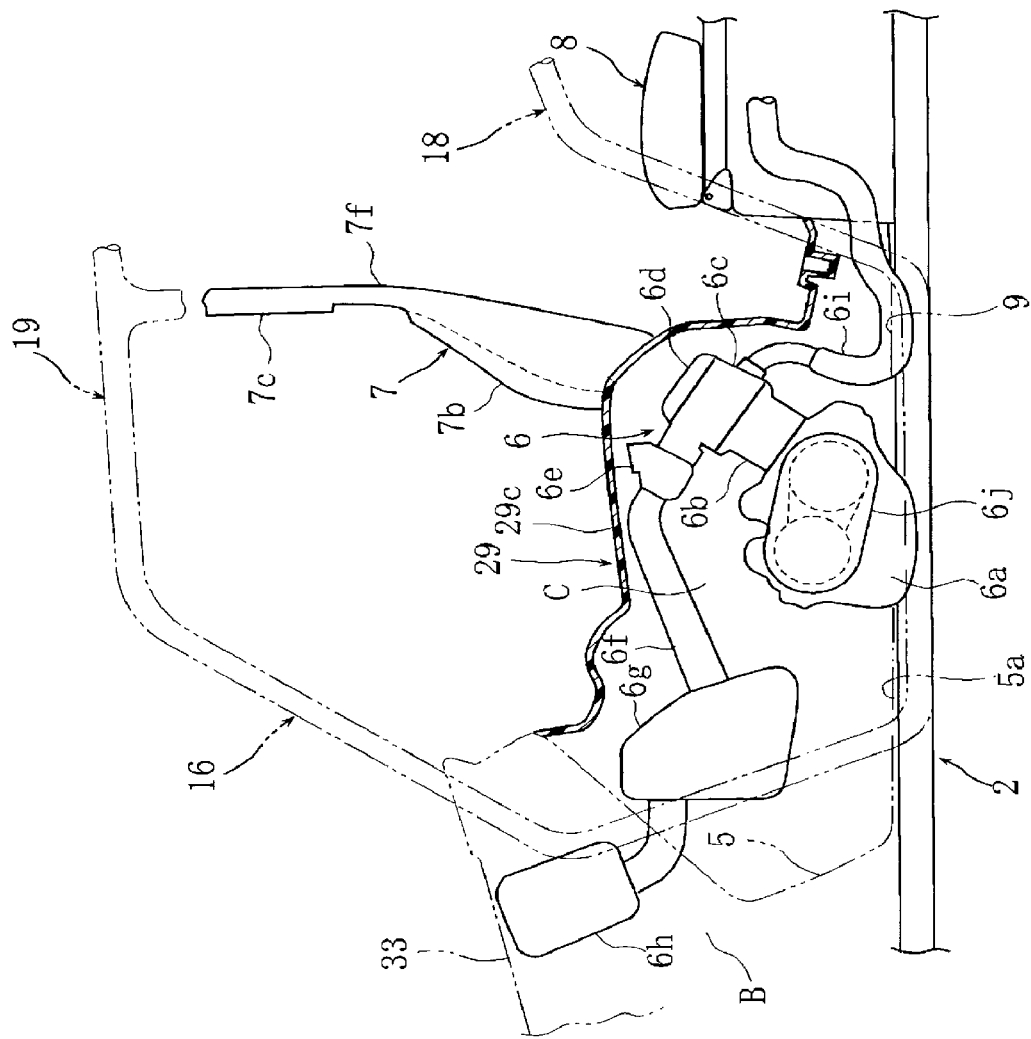
FIG. 4 is a cross-sectional diagram, illustrating the relationships between the center console and the engine unit.

Exemplary embodiments of the present invention will be explained in further detail below with reference to the accompanying figures.

FIGS. 1 through 13 are drawings for explaining a utility vehicle in accordance with various exemplary embodiments of the present invention. Unless otherwise indicated the terms "front," "behind," "forward," "back," "rear," "left," and "right" refer to "front," "behind," "forward," "back," "rear," "left," and "right" are from the perspective of a passenger seated in a seat.

Referring to the figures generally, a utility vehicle 1 is provided with a vehicle body frame 2, a pair of left and right front wheels 3 that are supported on the left and right side portions at the forward portion of the vehicle body frame 2 and a pair of left and right rear wheels 4 that are supported on the left and right side portions of the rear portion Utility vehicle 1 also includes a front panel 5 that is disposed to the rear of the front wheels 3 of the vehicle body frame 2, in the front/back direction of the vehicle and an engine unit 6 that is disposed to the rear, in the front/back direction of the vehicle, of the front panel 5 of the vehicle body frame 2.

Additionally, the utility vehicle 1 is provided with a front seat 7 that is disposed to the rear of the front panel 5 of the vehicle body frame 2 and a rear seat 8 that is disposed rear of the front seat 7. Utility vehicle 1 also includes rear floor 9 that is disposed at a position that is lower than a top end 4a of the back wheel 4, between the front seat 7 and the rear seat 8. The utility vehicle 1 includes a cabin structuring member 10, attached to the vehicle body frame 2, structured from left and right side portions and a ceiling portion of the cabin A.

The engine unit 6 has a structure that can be summarized as a cylinder body 6b, a cylinder head 6c, and a head cover 6d being joined together facing upward at the rear diagonal of the vehicle on the rear portion of the top surface of a crankcase 6a. A transmission case 6j is located on the left side portion of the crankcase 6a and houses a V-belt-type continuously variable transmission. Additionally, the throttle body 6e is connected to the front wall, in the front/back direction of the vehicle, of the cylinder head 6c, and a vacuum pipe 6f is connected to the throttle body 6e. Vacuum pipe 6f is formed to the rear of front panel 5, and extends to the space B that is formed by a hood 33. Air cleaner 6h is attached to the upstream end of the vacuum pipe 6f, with a surge tank 6g provided there between. An exhaust pipe 6i is connected to the rear wall of the cylinder head 6c.

Figure 5:
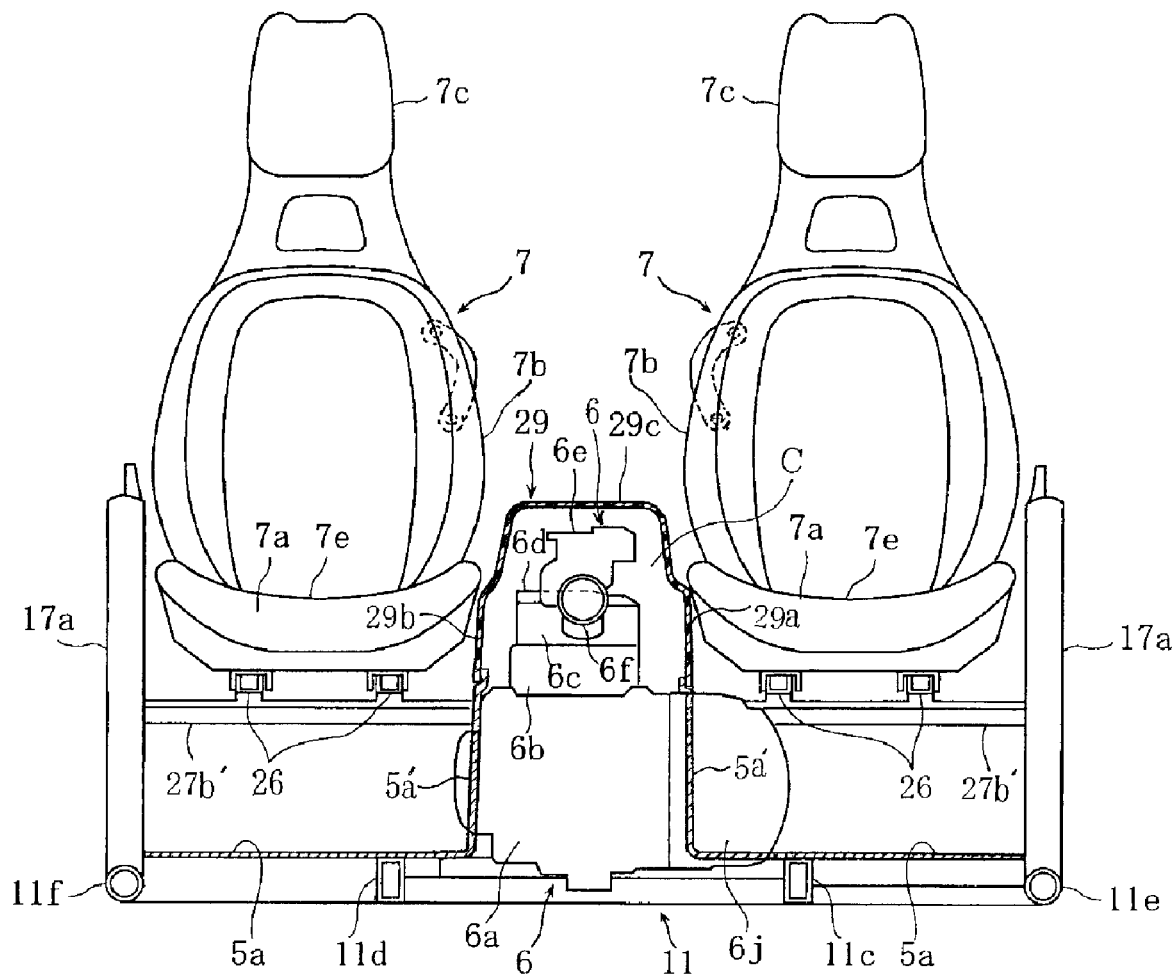
FIG. 5 is a cross-sectional diagram along the section V-V in FIG. 3, illustrating the relationship between the front seat, the center console, and the engine.
Figure 6:
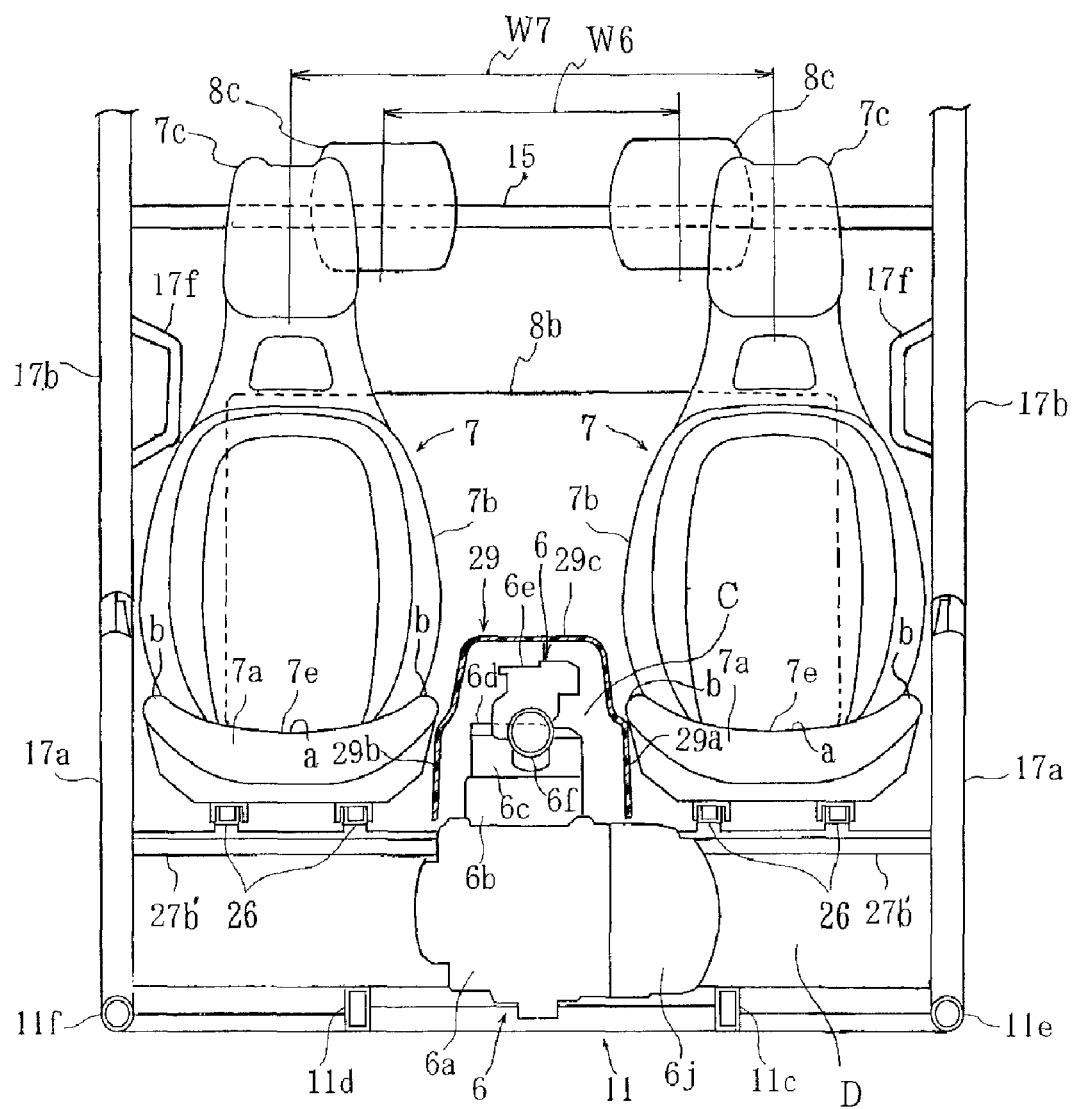
FIG. 6 is a cross-sectional diagram along the section VI-VI in FIG. 3, illustrating the relationships between the front seat, the center console, and the engine.
Figure 7:
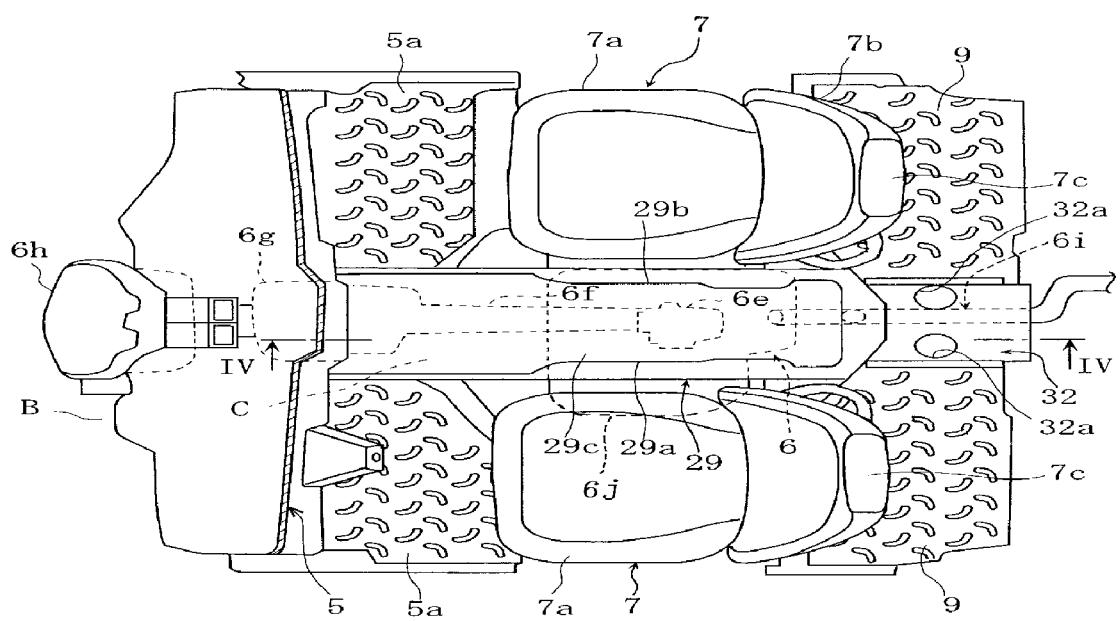
FIG. 7 is a plan view illustrating the relationships between the center console, the front floor, the front seat, and the rear seat.
Figure 8:
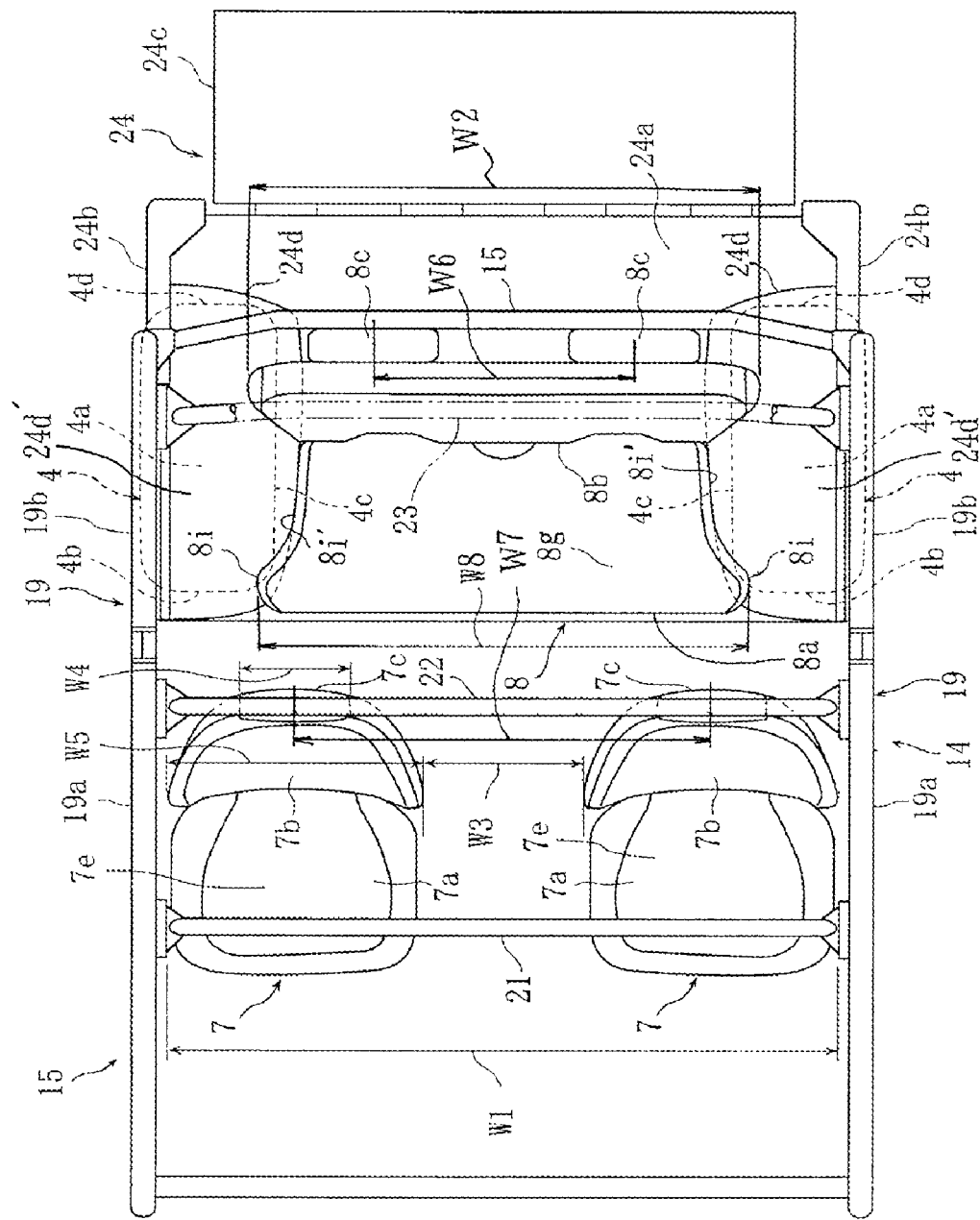
FIG. 8 is a plan view illustrating the relationships between the front seats and the rear seat.
Figure 9:
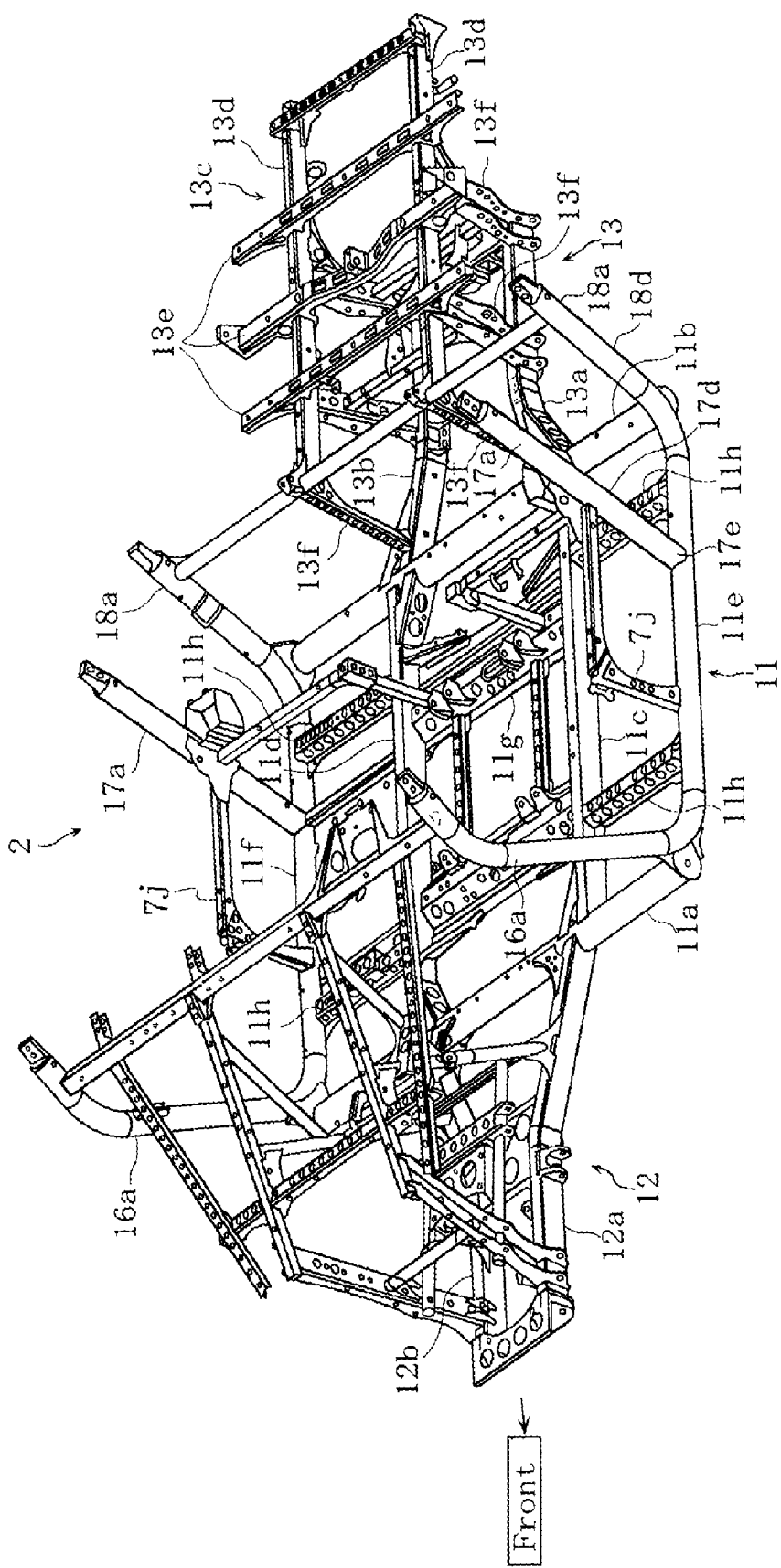
FIG. 9 is an oblique view illustrating the vehicle body frame and the lower portions of the roof support structure.
Figure 10:
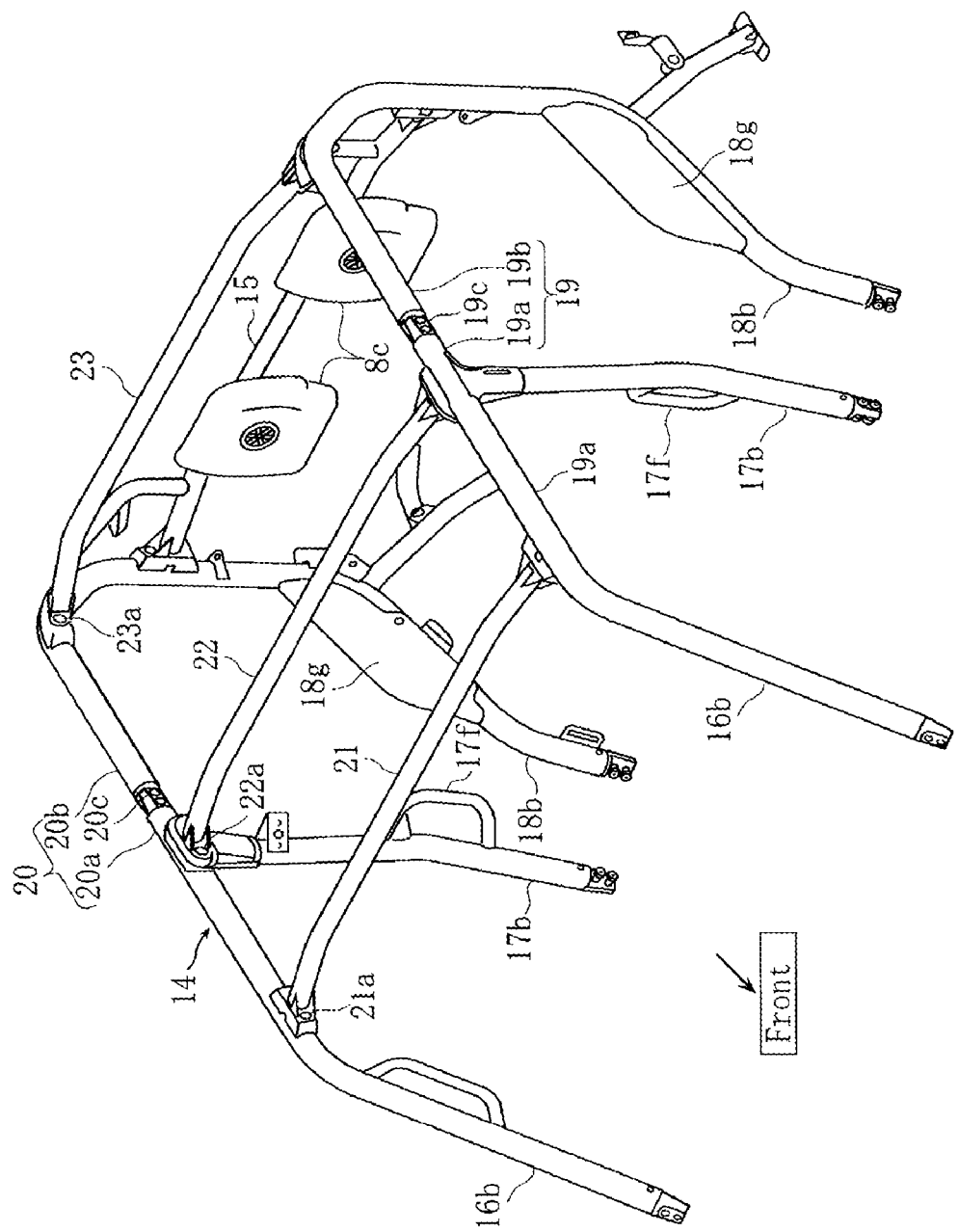
FIG. 10 is an oblique view illustrating the top portions of the roof support structures and the roof member.
Figure 11:
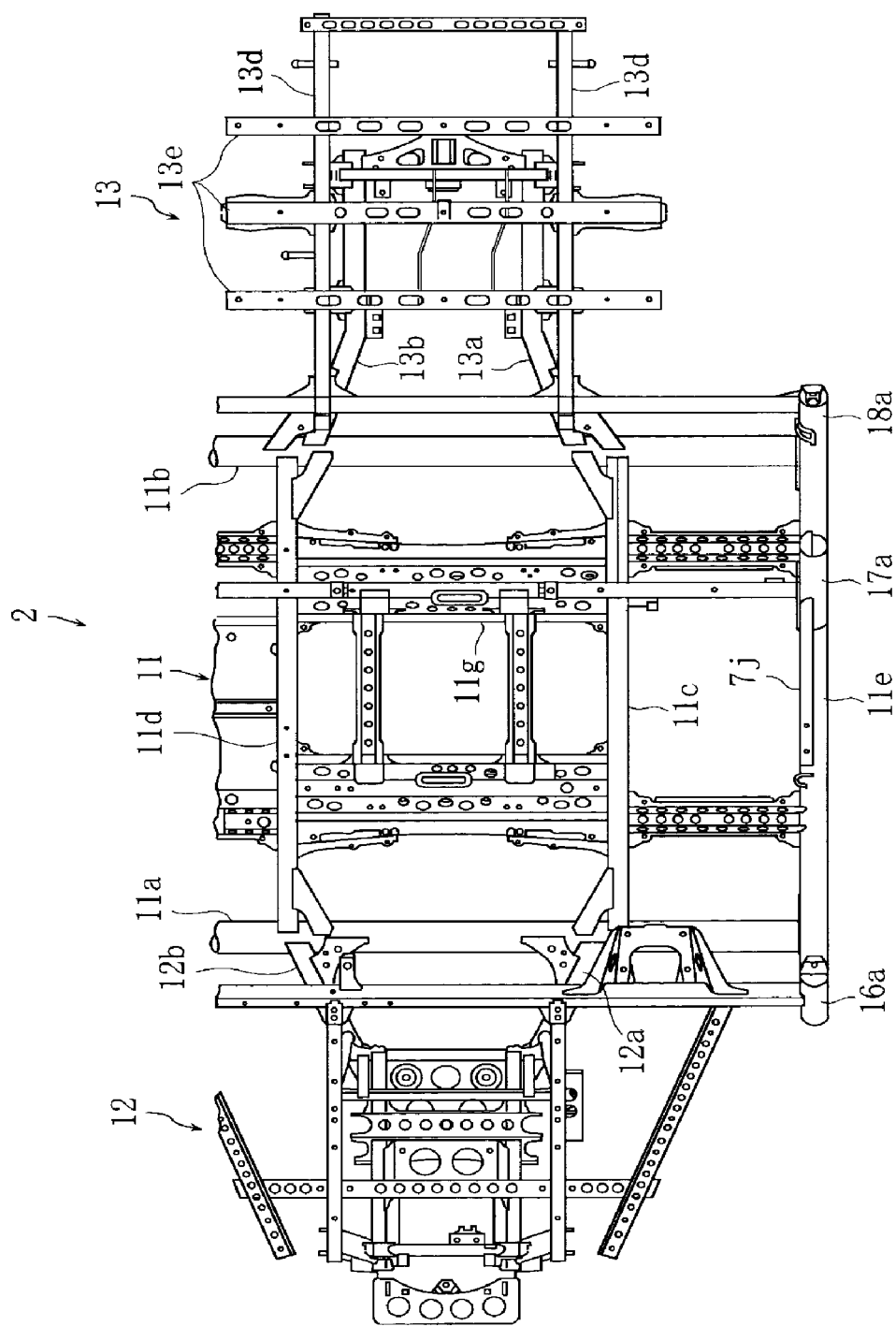
FIG. 11 is a plan view of a vehicle frame and a roof support lower portion.
Figure 12:
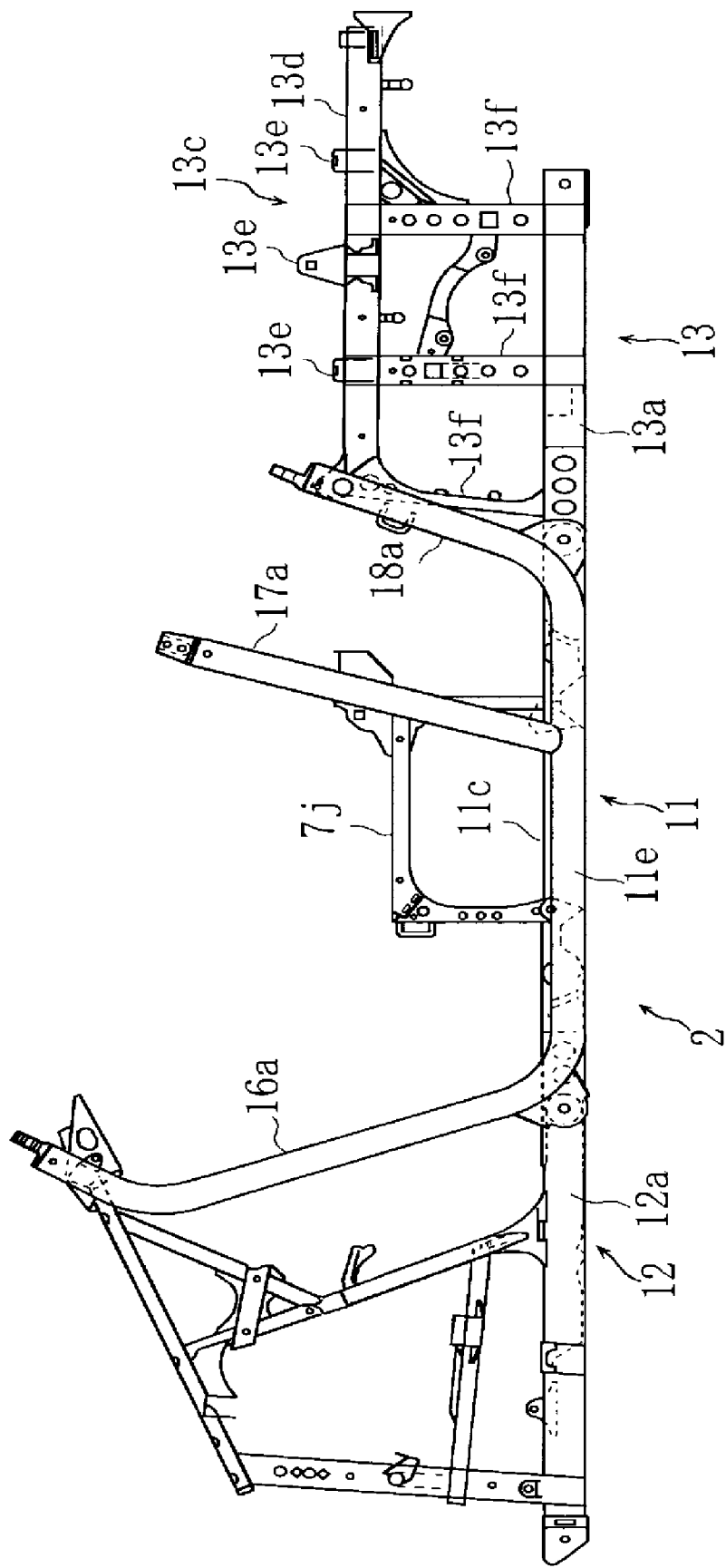
FIG. 12 is a left side view of a vehicle frame and a roof support lower portion.
Figure 13:
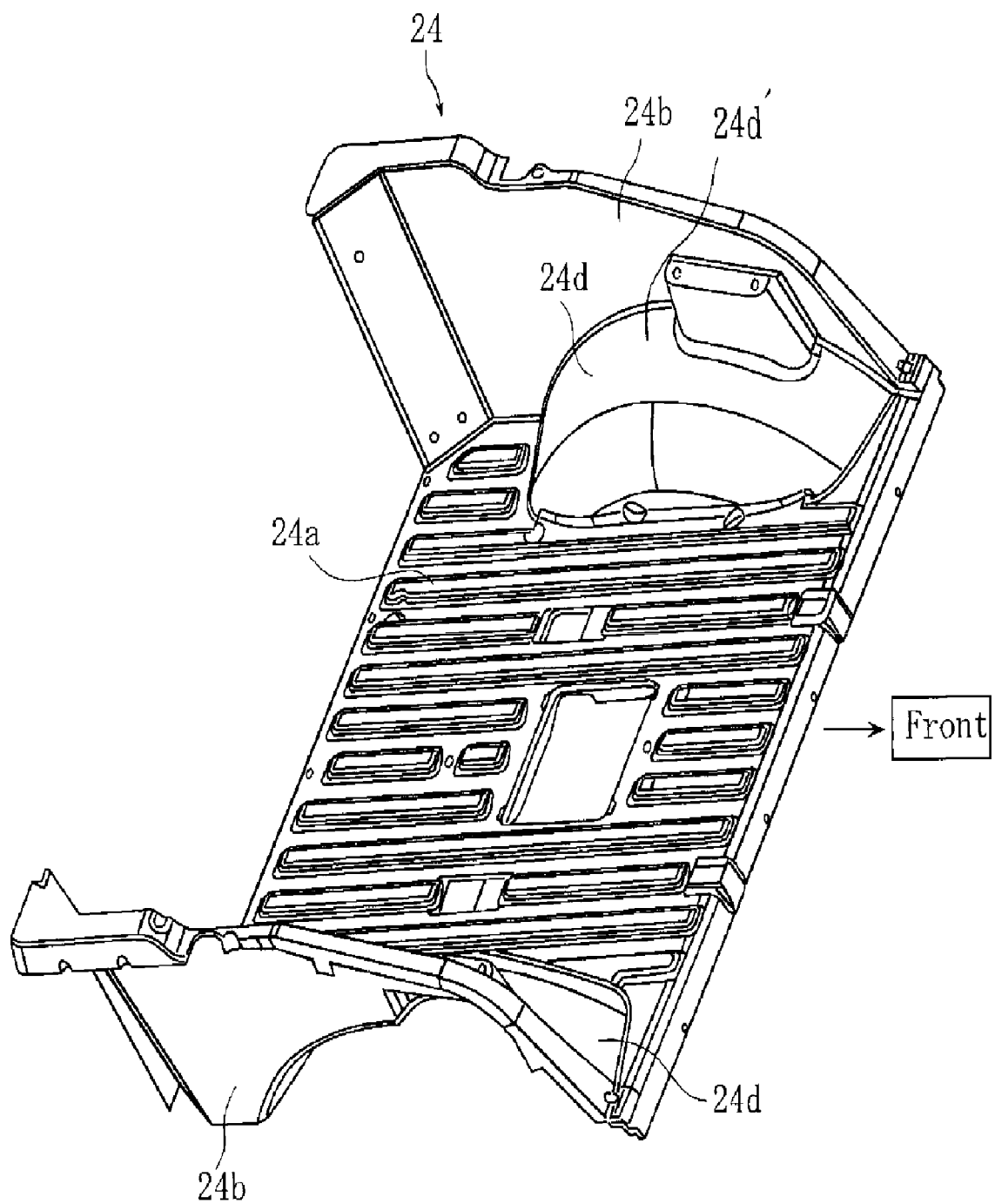
FIG. 13 is an oblique view of a cargo bed.

The engine unit 6 is disposed in an interior space C of the center console 29. The center console 29 includes a left side wall 29a, a right side wall 29b, and a top wall 29c, and extends in the rearward direction from the center portion, in the direction of width of the vehicle, of the front panel 5 to the rear of the rear end portion 7g of a seat cushion portion 7a of the front seat 7. Furthermore, as illustrated in FIG. 6, the upper portion above the transmission case 6j of the engine unit 6 is covered from above and from the left and right sides by a top wall 29c and by left and right side walls 29a and 29b of the center console 29. Additionally, as illustrated in FIG. 5, the portions of the left and right side walls 29a and 29b of the center console 29 that are further forward from the front seat 7 are connected to extension portions 5a' of the front floor 5a. These extension portions 5a' form a portion of the left and right side walls of the center console 29.

Furthermore, the top wall 29c of the center console 29 is positioned at a position that is higher than the center portion, in the direction of width of the vehicle, of the seating surface 7e of the seat cushion portion 7a of the front seat 7, and positioned at a position that is lower than the top end 5b of the front panel 5. The interior space C of the center console 29 communicates with the space B that is covered by a hood 33, so as to be able to open and close, forward of the front panel 5. Furthermore, the interior space C of the center console 29 communicates with the space D below the left and right front seats 7. The throttle body 6e that is connected to the engine unit 6, and the vacuum pipe 6f, and the surge tank 6g are disposed within this interior space C, and the air cleaner 6h is disposed within the interior space B. The utility vehicle 1 also includes a steering wheel 30, a lever 31a for changing the transmission between a high and a low gear, and a parking brake lever 31b.

The vehicle body frame 2 includes: a center frame 11 that structures the lower portion of the cabin A; a front frame 12, connected to the front end of the center frame 11, for structuring the front portion of the utility vehicle 1; and a rear frame 13, connected to the rear end of the center frame 11, for structuring the rear portion of the utility vehicle 1. The center frame 11 is essentially rectangular in the plan view, and includes: front and rear cross pipes 11a and 11b that are made from pipes that extend in the direction of width of the vehicle; left and right center main pipes 11c and 11d, made out of pipes, connecting at the center portion in the direction of width of the utility vehicle; and left and right side pipes 11e and 11f, made out of pipes, connecting at the outside end portions in the direction of width of the utility vehicle.

An engine bracket 11g, for mounting the engine unit 6, is provided between the left and right center main pipes 11c and 11d. Moreover, a floor bracket 11h, for supporting a front floor 5a and connecting to the center panel 5 extending in the rearward direction, may be provided between the left and right center main pipes 11c and 11d and the left and right side pipes 11e and 11f.

The front frame 12 includes left and right front main pipes 12a and 12b that extend rearward from the portion wherein the left and right center main pipes 11c and 11d of the cross pipe 11a are connected. These left and right front main pipes 12a and 12b extend angled towards the inside from the connecting portion, and then extend rearward in parallel with the center line of the vehicle. Front wheels 3 are supported, via front arms, on this portion that extends in parallel, so as to be able to sway freely.

The rear frame 13 has left and right rear main pipes 13a and 13b that extend to the rear from the portion wherein the left and right center main pipes 11c and 11d of the rear cross pipe 11b are connected, and a cargo bed frame 13c that is disposed above the rear main pipes 13a and 13b. The left and right rear main pipes 13a and 13b extend angled towards the inside towards the back from the connecting portion, and then extend further towards the rear in parallel with the center line of the vehicle. The rear wheels 4 are supported, via a rear arm, on the portion that extends rearward, so as to be able to sway freely up and down.

Additionally, the cargo bed frame 13c is formed through the connection of the rear main pipes 13a and 13b, left and right lengthwise frames 13d and 13d that extend in parallel, when viewed from the side of the vehicle, and a plurality of cross frames 13e that extend in the direction of width of the vehicle. Given this, the cargo bed frame 13c is secured, so as to be positioned above the rear main pipes 13a and 13b, through a plurality of leg members 13f.

Additionally, a cargo bed 24 is positioned on the cargo bed frame 13c. This cargo bed 24 includes a bottom wall portion 24a that is placed on top of the cargo bed frame 13c, left and right side wall portions 24b and 24b that are formed integrally so as to rise upwards from the left and right end portions of the bottom wall portion 24a, and a door 24c that structures the back wall, and is open in the forward and upward directions. Tire housings 24d are provided on the left and right side portions of the bottom wall portion 24a so as to bulge upwards and towards the inside, in the direction of width of the vehicle.

The front seat 7 is a bucket type seat wherein the left and the right are separate, and the seat cushion and backrest are structured as a single unit. The left and right front seats 7 each have their respective seat cushion portions 7a, backrest portions 7b that rise up in the upward direction from the rear end portions of the seat cushion portions 7a, and headrest portions 7c that are formed integrally at the upper end portion of the backrest portions 7b. The seat cushion portions 7a are mounted on seat rails 7d so as to be able to slide forward and backward. The seat rails 7d are secured to the center frame 11 through seat brackets 7j.

The rear seat 8 is of a bench type seat and includes: a single seat cushion portion 8a that extends in the direction of width of the vehicle so as to be able to seat both a left and a right passenger; a single backrest portion 8b that, similarly, extends in the direction of width of the vehicle so as to be able to support the backs of both the left and the right passengers; and headrest portions 8c and 8c, which are formed independently on the left and the right. The backrest portion 8b is disposed so as to be coincident, from above, with the rear end portion of the seat cushion portion 8a, and is attached so as to be able to rotate forward via a bracket 8d at the rear end portion thereof.

The seat cushion portion 8a of the rear seat 8, is disposed at a position that, when viewed from above, is between the left and right tire housings 24d. More precisely, the left and right outer end portions 8i' of the seat cushion portion 8a are positioned towards the inside, in the direction of width of the vehicle, from the interior end portions 4c of the tire housings 24d, and, by extension, from the rear wheels 4. On the other hand, the left and right end portions 8i, which are disposed on the front end and the left and right ends of the seat cushion portion 8a, are disposed so as to be coincident with the front end portions of the tire housings 24d. Here the tire housings 24d are formed angled downward towards the front so as to be lower the further forward, so that the left and right end portions 8i can secure an adequate cushion width, without being higher than the other portions, even when the left and right end portions 8i are disposed over the front end portions of the tire housings 24d. The headrest portions 8c may be separate from the backrest portion 8b in the upward direction. The headrest portions 8c may be attached to a rear cross pipe 15, as further described below.

The front portion of the bottom surface of the seat cushion portion 8a is supported so as to be able to rotate to the front or to the rear by a rotating shaft 8e at the front end portion of the cargo bed frame 13c. The rear end portion of the seat cushion portion 8a is provided with a rear seat lock member 8f that locks to the rear seat 8 to, and unlocks the rear seat 8 from, the cargo bed frame 13c.

The width dimension W2, in the direction of width of the utility vehicle, of the outside ends of both the left and the right of the backrest portion 8b of the rear seat 8 is set so as to be smaller than the width dimension W1, in the direction of width of the vehicle, of the left and right front seats 7. Additionally, the headrest portions 8c of the rear seats 8 are disposed so that the gap W6, in the direction of width of the vehicle, is narrower than the gap W7, in the direction of width of the vehicle, of the headrest portions 7c of the front seat 7, and are thus disposed further towards the interior, in the direction of width of the vehicle.

Additionally, the width dimension W8, in the direction of width of the utility vehicle, of the seating surface 8g upon which the passenger is seated, in the rear seat 8 is set to be smaller than the width dimension W1, in the direction of width of the vehicle, of the left and right front seats 7, and less than the width dimension W2, in the direction of width of the vehicle, of the backrest portion 8b of the rear seat 8. Additionally, the seating surface 8g is disposed in a position that is lower than the top ends 24d' of the tire housings 24d. Furthermore, the seating surface 8g in the present form of embodiment means the portion whereon the passenger can sit without obstruction. For example, it would be difficult to sit if the seating surface 8g were provided all the way to the top surfaces of the tire housings 24d. That is, the tire housings 24d are fabricated so as to be higher the further towards the outside, in the direction of width of the vehicle, so that merely extending the seating surface to the outside on the left and the right would cause it not to function as a seating surface because it would be difficult to sit upon the extended portion on the tire housing.

Because, in this way, the width dimension W8 of the seating surface 8g of the rear seat 8 is set so as to be narrower than the width dimension W1 of the front seat 7, the passenger in the rear seat 8 will sit in a position that is shifted towards the center of the vehicle from the passenger in the front seat 7. In addition, the front seats 7 are split into the left and the right, and a gap W3, wherein the engine unit 6 may be disposed, is opened therebetween. Because of this, the passenger seated in the rear seat 8 is able to secure an adequate field of view in the forward direction of the vehicle between the left and right front seats 7.

The cabin structuring member 10 includes a front roof support structure 16, provided on the left and right side portions of the center frame 11; a center roof support structure 17; a rear roof support structure 18; and a roof member 14 that connects the top portions of the roof support structures 16, 17, and 18. A cabin with a feeling of spaciousness is achieved by this cabin structuring member 10.

The front roof support structure 16 is disposed on the front end portions on the left and right side portions of the center frame 11. The front roof support structure 16 includes pipes that extend upwards extending from the front end portion of the left and right side pipes 11e and 11f. Additionally, the front roof support structure 16 is partitioned into lower portions 16a and upper portions 16b which are connected via bolts 16c that penetrate therethrough in the front/back direction of the vehicle.

The center roof support structure 17 is provided in the center portion of the vehicle at the left and right side portions of the center frame 11, further towards the rear of the utility vehicle 1 than the front roof support structure 16. The center roof support structure is connected to the middle of the left and right side pipes 11e and 11f, and includes pipes extending upward therefrom. The front roof support structure 17 is partitioned into lower portions 17a and upper portions 17b that and are connected via bolts 17c that penetrate therethrough.

The rear roof support structure 18 is disposed at the rear end portion on the left and right side portions of the center frame 11, further towards the rear of the utility vehicle 1 than the center roof support structure 17. The rear roof support structure 18 includes pipes that extend upwards extending from the rear end portion of the left and right side pipes 11e and 11f. The rear roof support structure 18 is partitioned into lower portions 18a and upper portions 18b that are connected by bolts 18c that penetrate therethrough.

The roof member 14 includes left and right side roof pipes 19 and 20, which extend in the front/back direction of the vehicle and which connect together the upper end portions of the front, center, and rear roof structures 16, 17, and 18. The roof member further includes a front cross pipe 21, a center cross pipe 22, and a rear cross roof pipe 23, which extended in the direction of width of the vehicle. Front cross pipe 21 connects together the front end upper portions 16a, second cross pipe 21 connects together center cross portions 17a, and rear cross pipe 23 connects together the rear end portions 18a of the left and right side roof pipes 19 and 20.

The left side roof pipe 19 is partitioned into a forward portion 19a and a rear portion 19b, and is connected by bolts 19c. Similarly, the right side roof pipe 20 is partitioned into a forward portion 20a and a rear portion 20b, and is connected by bolts 20c. The front, center, and rear cross roof pipes 21, 22, and 23 are connected by bolts 21a, 22a, and 23a to the left and right side roof pipes 19 and 20.

In exemplary embodiments, the front roof support structure 16 is formed with bends so as to resemble the "<" signs overall, and, in the vicinities of the bent portions 16d, are partitioned into the upper portions 16b and the lower portions 16a. The passengers in the rear seat 8 will be seated in positions further towards the center of the vehicle than the passengers in the front seat 7. In addition, the front seats 7 are split into the left and the right, so that a gap W3, wherein the engine unit 6 may be disposed, is opened therebetween. As a result, the passengers seated in the rear seat 8 are able to secure a field of view, in the forward direction of the automobile, between the left and right front seats 7.

The center roof support structure 17 is disposed so as to be essentially coincident with the backrest portions 7*b* of the front seats 7. Furthermore, the downward direction portions 17*d* of the center roof support structure 17, which are lower than the headrest portions 7*c* of the front seats 7, are inclined so as to be positioned further forward the further down. Additionally, the lower ends 17*e* of the center roof support structure 17 are positioned so as to be further forward from the rear end portion 7*f* of the front seat 7. The lower ends 17*e* are positioned so as to be further forward than the rear end portions 7*g'* of the seat cushion portion 7*a* and the lower end portion 7*g* of the backrest portion 7*b*.

Note that while in one exemplary embodiment, the portions of the center roof support structure 17 that are positioned lower than the headrest portions 7*c* of the front seats 7 are angled as set forth above, it is also contemplated that those portions of the center roof support structure 17 that are positioned lower than at least the seating surface 8*g* of the seat cushion portion 8*a* of the rear seat 8 may also be angled. Additionally, the center roof support structure 17 is provided with grip portions 17*f* that can be grasped by the passengers of the rear seat 8. These grip portions 17*f* are disposed at positions that are higher than the seating surfaces 7*e* of the front seat 7, and the seating surface 8*g* of the rear seat 8.

In addition, the downward direction portions 18*d* of the rear roof support structure 18, which are positioned lower than the seating surface 8*g* of the rear seat 8, are inclined backwards so as to be essentially parallel with the downward direction portions 17*d* of the center roof support structure 17, positioned so as to be further back the higher on the downward direction portions 18*d*. The upper end portions 18*f* of the downward direction portions 18*d* are positioned to the rear of the front end portion 8*h* of the rear seat 8.

The middle portions 18*e*, of the rear roof support structure 18, which extend upward from the upper end portions 18*f* of the downward direction portions 18*d*, are inclined backwards even more than are the lower portions 18*d*. Additionally, these middle portions 18*e*, when viewed from the side of the vehicle, extend towards the rear cutting across the backrest portion 8*b* of the rear seat 8. Furthermore, the rear end portions 18*b'*, which extend upwards essentially vertically, after the middle portions 18*e*, are positioned forward in the front/back direction of the vehicle, from the rear end portions 4*d* of the rear wheels 4.

Additionally, the bar-shaped members 18*h* are disposed higher than the middle portions 18*e*, and these bar-shaped members 18*h* are covered by plastic covers 18*g*. A portion of the rear support structure 18, specifically, the middle portion 18*e*, are coincident with a portion of the rear wheels 4, in the front/back direction of the vehicle. That is to say, the middle portion 18*e* is coincident with a portion of the rear wheels 4, when viewed from above the vehicle. Restating again, the position, in the front/back direction, of the middle portion 18*e* is essentially coincident with the position of the rear wheels 4 in the front/back direction. Consequently, in exemplary embodiments, not only is the middle portion 18*e* of the rear roof support structure 18 inclined greatly, but the rear wheels 4 are also positioned below the middle portion 18*e*, and thus the rear wheels 4 are positioned much further forward than in vehicles having conventional front seats and rear seats.

Given the utility vehicle 1 as set forth, the downward direction portions 18*d* of the rear roof support structure 18 that are positioned lower than the seating surface 8*g* of the seat cushion portion 8*a* are angled so as to be positioned further rearward the higher up, enabling the rear wheels 4 to be positioned further forward, making it possible to reduce the front/back length of the rear seat 8, thereby making it possible to make the vehicle more compact while achieving a spacious cabin. Additionally, the downward direction portions 17*d* of the center roof support structure 17 that are positioned lower than the seating surface 8*g* of the seat cushion portion 8*a* of the rear seat 8 are angled so as to be positioned further forward the lower down, so that the downward direction portions 17*d* do not interfere when getting into or out of the vehicle. That is, this makes it possible to secure easy ingress/egress for the rear seat passengers in a vehicle that is more compact.

Additionally, the lower end portions 17*e* of the center roof support structure 17 are positioned so as to be forward of the rear end portions 7*f* of the front seats 7, in the front/back direction of the vehicle, enabling the downward direction portions 17*d* to more reliably avoid interfering with the legs, etc., of the rear seat passengers when the rear seat passengers enter or exit the vehicle, enabling an improvement in the ease of ingress/egress.

Furthermore, grip portions 17*f* are provided on the portions of the center roof support structure 17 that are positioned higher than the seat surface 8*g* of the seat cushion portion 8*a* of the rear seat 8, enabling an improvement in the ease of ingress/egress through the rear seat passenger grasping a grip portion 17*f*.

Furthermore, at least a portion of the rear roof support structure 18, specifically the middle portions 18*e* and the downward direction portions 18*d*, is positioned forward of the rear end portions 4*d* of the rear wheels 4, and the middle portions 18*e* are coincident with the rear wheels 4, in the front/back direction of the vehicle, and so the rear wheels 4 are positioned further forward than in a vehicle that has a conventional front seat and rear seat, enabling the utility vehicle 1 to be made more compact.

Additionally, the middle portions 18*e* are angled further towards the rear than the downward direction portions 18*d*, and are formed extending so as to cut across the backrest portion 8*b* of the rear seat 8, when viewed from the side of the vehicle, enabling the middle portions 18*e* more certainty in avoiding interfering with the ingress/egress of the rear seat passengers, and thus enabling a further improvement in the ease of ingress/egress of the rear seat passengers. Additionally, this can increase the feeling of spaciousness for the rear seat passengers.

Additionally, the width W8, in the direction of width of the vehicle, of the seating surface 8*g* whereon the passengers sit in the rear seat 8 is formed so as to be narrower than the width W1 of the front seat 7 in the direction of width of the vehicle. Because of this, the passengers in the rear seat 8 will be seated in positions further towards the center of the vehicle than the passengers in the front seat 7. In addition, the front seats 7 are split into the left and the right, so that a gap W3, wherein the engine unit 6 may be disposed, is opened therebetween. Because of this, the passengers seated in the rear seat 8 are able to secure a field of view, in the forward direction of the automobile, between the left and right front seats 7.

In addition, the seating surface 8*g* of the rear seat 8 is positioned between the left and right tire housings 24*d* that are disposed above the rear wheels 4, and the seating surface 8*g* is disposed at a position that is lower than the top end 24*d'* of the tire housings 24*d*, making it possible to secure the passenger vehicle space for the rear seat passengers while securing the vertical stroke length of the rear wheels 4.

On the other hand, while the seat cushion portion 8a of the rear seat 8 is provided so as to be narrow in the width dimension so as to be disposable between the left and right tire housings 24d, the left and right end portions 8i of the seat cushion portion 8a are disposed over the tire housings 24d. Because of this, the rear seat 8 can be disposed between the tire housings 24d while securing the seating surface area of the rear seat 8.

That is, the tire housings 24d are formed in a shape that slopes downward towards the front so as to be lower the further forward from the top end 24d', so there is no need for the left and right end portions 8i of the front end of the seating surface 8g to be higher than the seating surface of the rear portion, and thus the left and right end portions 8i can also function as seating surfaces, and it is because of this that it is possible to secure the seating surface.

In addition, the headrest portions 8c of the rear seat 8 are not only disposed separated from the backrest portion 8b in the upward direction, but also the headrest portions 8c are attached to the rear cross pipe 15, so that when the rear seat 8 is folded down, there is no need to remove the headrest portions 8c from the backrest portion 8b, making it possible to simplify, by that much, the operation of folding down.

Note that in the present form of embodiment the explanation was of a case wherein the rear end portions 18b' of the roof support structure 18 were disposed forward of the rear end portions 4d of the rear wheels 4. However, the present invention is not limited to the form of embodiment set forth above. The present invention includes both the case wherein the rear end portions 18b' of the rear roof support structure 18', for example, are positioned further to the rear of the rear ends 4d of the rear wheels 4, and the case wherein the rear end portions 18b' of the rear roof support structure 18" are positioned further forward of the front ends 4b of the rear wheels 4.

When the rear end portions 18b' of the rear support structure 18' are to the rear of the rear ends 4d of the rear wheels 4, it is possible to make the space wider for the passengers seated in the rear seat, improving the feeling of spaciousness for the passengers, while still making the vehicle more compact.

Additionally, while the explanation in the example of embodiment set forth above was for a four-wheeled vehicle with a pair of left and right rear wheels, the present invention can be applied also to a vehicle with two pairs of left and right rear wheels, or in other words, to a six-wheeled vehicle. Furthermore, while the exemplary embodiments discussed included front, center, and rear roof support structures 16, 17, and 18 it is also contemplated that the present invention can also be applied to a vehicle wherein center roof support structure 17 is not provided.

What is claimed is:

1. A utility vehicle comprising:
a vehicle body frame including a left side portion and a right side portion;
a front seat affixed to the vehicle body frame;
a rear seat affixed to the vehicle body frame and arranged rearward of the front seat in a front/back direction of the vehicle;
a rear roof support structure including a left pipe member and a right pipe member arranged to extend substantially vertically from the vehicle body frame and disposed, respectively, at the left side portion and the right side portion of the vehicle body frame rearward of the rear seat, at least lower portions of the left pipe member and the right pipe member being positioned lower than a seating surface of a seat cushion portion of the rear seat and angled so as to be positioned further rearward in the front/back direction of the vehicle as the lower portions extend upwardly; and
a pair of rear wheels supported by the vehicle body frame and provided at a position below the seat cushion portion of the rear seat, front ends of the pair of rear wheels are arranged forwardly in the front/back direction of the vehicle of both a rear end of the rear roof support structure and a rear end of the rear seat; wherein
a bottom end of the rear roof support structure is positioned forwardly of the front ends of the pair of rear wheels in the front/back direction of the vehicle.

2. The utility vehicle as set forth in claim 1, wherein at least a portion of a middle portion, in a vertical direction, of the rear roof support structure is higher than the seating surface of the seat cushion portion of the rear seat, and coincident with at least a portion of the pair of rear wheels in the front/back direction of the vehicle.

3. The utility vehicle as set forth in claim 2, wherein the portion of the middle portion of the rear roof support structure is angled to extend upwardly as the middle portion extends rearwardly in the front/back direction of the vehicle.

4. The utility vehicle as set forth in claim 2, wherein the middle portion of the rear roof support structure includes a plurality of frame members, and, when viewed from a side of the vehicle, extends rearwardly and across a backrest portion of the rear seat.

5. The utility vehicle as set forth in claim 4, wherein the middle portion of the rear roof support structure includes a surface that is wider in the vertical direction and in the front/back direction than remaining portions of the rear roof support structure.

6. The utility vehicle as set forth in claim 1, wherein outside end portions of the rear seat in a width direction of the vehicle are positioned inside of the pair of rear wheels in the width direction of the vehicle.

7. The utility vehicle as set forth in claim 1, wherein a width of the seating surface in a width direction of the vehicle is narrower than a width of the front seat in the width direction of the vehicle.

8. The utility vehicle as set forth in claim 1, wherein a bottom end of the rear roof support structure is positioned forward of a front end of the rear seat in the front/back direction of the vehicle.

9. The utility vehicle as set forth in claim 1, wherein a wheel axle of the pair of rear wheels is positioned forwardly of both a rear end of the rear seat and a rear end of the rear roof support structure in the front/back direction of the vehicle.

10. The utility vehicle as set forth in claim 1, further comprising a left tire housing and a right tire housing positioned above the pair of rear wheels, wherein the seating surface of the rear seat is positioned between the left and right tire housings and below a top end of the left and right tire housings.

11. The utility vehicle as set forth in claim 1, wherein the pair of rear wheels are positioned directly under the rear seat.

12. The utility vehicle as set forth in claim 1, wherein a wheel axle of the pair of rear wheels is positioned directly under the rear seat and directly under at least a portion of the left pipe member and the right pipe member of the rear roof support structure.

13. The utility vehicle as set forth in claim 2, wherein a wheel axle of the pair of rear wheels is positioned directly under the middle portion of the rear roof support structure.

* * * * *